United States Patent Office 2,992,268
Patented July 11, 1961

2,992,268
PROCESS FOR THE PREPARATION OF 1-CYANO-2,3-DICARBOMETHOXYPROPANE
Abraham Bavley, Brooklyn, and Bryce E. Tate, Kew Gardens, N.Y., assignors to Chas. Pfizer & Co., Inc., New York, N.Y., a corporation of Delaware
No Drawing. Filed Mar. 7, 1958, Ser. No. 719,739
3 Claims. (Cl. 260—465.4)

This invention is concerned with a process for the preparation of 1-cyano-2,3-dicarbomethoxypropane from dimethyl itaconate. More particularly, it is concerned with a process for the preparation of 1-cyano-2,3-dicarbomethoxypropane by reaction of dimethyl itaconate with hydrogen cyanide in the presence of potassium cyanide.

1-cyano-2,3-dicarbomethoxypropane is readily converted to tricarballylic acid and its derivatives which are important commercial compounds. For example, tricarballylic acid anhydride is a very effective curing agent for epoxy resins as described in copending application, Serial Number 711,809, filed Jan. 29, 1958. The tricarballylic acid higher alkyl esters are useful both as plasticizers and as jet engine lubricants.

The employment of hydrogen cyanide in reaction with unsaturated compounds has, in the past, been subject to considerable limitations. For example, many prior art processes require the use of a solvent and large excesses of hydrogen cyanide gas for best yields. As is well known, hydrogen cyanide is a dangerous toxic gas. The employment of large excesses of this toxic substance is not only economically impractical but also presents considerable difficulty in large scale commercial processes since such use endangers the operator. Further, hydrogen cyanide has a marked tendency to polymerize particularly in the presence of basic catalysts such as an alkali metal cyanide which is frequently employed. The polymer is an unreactive, black solid which not only decreases the efficiency of the reaction but also necessitates the removal of the polymer from the desired product. The latter is time-consuming and considerably cumbersome in obtaining the desired product in large scale industrial processes. As mentioned above, solvents are usually employed in most prior art processes involving reaction of hydrogen cyanide with unsaturated compounds which further encumbers large scale commercial processes necessitating the removal of solvent before obtaining the product.

It has been surprisingly found that hydrogen cyanide may be added to dimethyl itaconate under certain critical conditions as described below, in a relatively simple, highly efficient, economical process which is amenable to large scale industrial production of 1-cyano-2,3-dicarbomethoxypropane, and subsequently, tricarballylic acid, an important industrial compound.

The advantages of the present process are many, for example, no solvent is required for the reaction. Excellent yield of the product is obtained. Only comparatively little, if any, excess hydrogen cyanide is employed, thus minimizing hydrogen cyanide polymerization. The yield of product is so high, i.e. the reaction is so efficient, that the crude product may be employed for the preparation of tricarballylic acid and its derivatives without the necessity of costly isolation and purification. In those cases where the pure product is desired, the reaction mixture need only be distilled, the small quantity of contaminants being more volatile and easily separated.

The process of the present invention is carried out by passing hydrogen cyanide gas into dimethyl itaconate in the presence of potassium cyanide. An equal molar ratio of the reactants may be employed to provide excellent yields of the product. Generally, it is preferred to employ from about 1 to about 1.2 moles of hydrogen cyanide per mole of itaconate for best yields, for example, yields of over 90%. Larger amounts of hydrogen cyanide may be employed but are not found to appreciably improve the yield. The amount of potassium cyanide to be used may range from about 0.1 to about 5 mole percent based on dimethyl itaconate. The use of a larger amount provides no appreciable advantage and therefore is not preferred.

Hydrogen cyanide may be added to the reaction mixture by any of the methods usually employed in the art. For example, it may be added in the gaseous state or, since it is a low boiling liquid under normal atmospheric conditions, in the liquid state. Regardless of the state it is preferably added to the heated reaction mixture over a period of time of at least 15 minutes, preferably from about 15 to about 60 minutes to avoid possible polymerization of hydrogen cyanide which may take place with a rapid rate of addition. The hydrogen cyanide may be added at a slower rate, for example, for more than one hour, but no noticeable increase in the yield of product is realized in so doing. The reaction temperature may be maintained from about 36° C. to about 120° C., although preferably from about 60° to about 80° C. The use of higher temperatures may reduce the efficiency of the reaction through the volatilization of hydrogen cyanide. Although normal atmospheric pressure is generally preferred, superatmospheric pressure may be used in the present process particularly at higher temperature, although this is not necessary. As in the case with most chemical reactions, the reaction rate and yield are determined by the temperature employed. A reaction time of from about 2 to 24 hours provides excellent yield of the product. With the above described preferred temperature range, a reaction time of from about 3 to about 7 hours is suitable. To obtain the excellent yields of the present process agitation of the reaction mixture is required to effect efficient use of the catalyst, i.e. potassium cyanide. Agitation may take several forms, for example, mechanical stirring or shaking of the reaction mixture. A convenient method for small scale production is the employment of the hydrogen cyanide gas stream to agitate the reaction mixture. Generally, any type of agitation which will efficiently disperse the catalyst is the reaction mixture will suffice.

The product may then be obtained by standard procedures, for example, distillation of the reaction mixture at reduced pressure to obtain 1-cyano-2,3-dicarbomethoxypropane. Alternatively, the product may be converted to tricarballylic acid without isolation of the product, by standard procedures, for example, hydrolysis with aqueous alkali.

The hydrogen cyanide to be employed in the above described process may be produced by any of the standard procedures commonly employed in the art. One such method involves the treatment of an alkali metal cyanide, for example, sodium or potassium cyanide, with an acid such as hydrochloric acid, sulfuric acid and so forth in a suitable gas generator. It is preferred to employ the gas in a substantially anhydrous condition although the presence of a minor amount of moisture does not seriously interfere with the reaction. Liquid hydrogen cyanide is a commercially available product which is readily adaptable for use in the present process since it is easily weighed and obviously more efficient than a gas generator. Further, when gas generator-produced hydrogen cyanide is employed it is preferred to liquefy the gas so that it may be weighed, thus avoiding the use of unduly large excesses of the reactant for the above mentioned reasons. The liquefied hydrogen cyanide is then gently warmed to produce the gaseous form which is then conventionally introduced into the reaction mixture. Alternatively, the liquid form may be added dropwise to the reaction mixture. However, this latter method necessitates the use of a cooled dropping funnel which, since it provides no advantage over the former, it not preferred.

The outstanding results obtained by the process of the present invention are not clearly understood. When employing the present process with other dialkyl esters of itaconic acid, it has been found that little, if any, product is obtained. For example, when dibutyl itaconate is employed in the present process over 90% of the ester is recovered unreacted. Further, when employing other basic cyanides as catalysts, for example, sodium cyanide, little, if any, 1-cyano-2,3-dicarbomethoxypropane is obtained, but rather over 90% of the original dimethyl itaconate is recovered from the reaction mixture. No attempt is herein made to explain the results. However, regardless of the theory, the present process provides an economical and practical method of producing 1-cyano-2,3-dicarbomethoxypropane, and subsequently, tricarballylic acid, under the specified conditions mentioned above.

Dimethyl itaconate is readily obtainable by the complete esterification of itaconic acid, a known compound, with methyl alcohol by standard esterification procedures well known to those skilled in the art.

As mentioned above, the product of the present invention, i.e., 1-cyano-2,3-dicarbomethoxypropane, may be converted to tricarballylic acid and its derivatives by standard procedures. For example, tricarballylic acid may be obtained by aqueous basic hydrolysis of the present product by standard procedures. The anhydride of tricarballylic acid may be prepared by refluxing the acid with acetic anhydride and removing the resulting acetic acid-acetic anhydride mixture by distillation leaving tricarballylic acid anhydride as the residue. The esters of tricarballylic acid may be prepared by standard procedures, for example, by reaction of tricarballylic acid with the desired alcohol in the presence of an esterification catalyst to obtain the triester.

The following examples are given by way of illustration and are not to be construed as limitations of this invention, many variations of which are possible within the scope and spirit thereof.

Example I

To 314 g. (2.0 moles) of dimethyl itaconate in a flask equipped with an ice-cooled condenser and stirrer, was added 5 g. (0.08 mole) potassium cyanide. The reaction mixture was heated at 60° C. and 64.8 g. (2.4 moles) of hydrogen cyanide was added to the stirred mixture over a period of one hour. Stirring and heating was continued for an additional six hours. Distillation of the resultant reaction mixture at reduced pressure gave only a small amount of forerun and 358 g. (96% yield) of 1-cyano-2,3-dicarbomethoxypropane distilling at 120° to 123° C. (1.2 mm.).

Elemental analysis of the product gave the following results.

Calcd. for $C_8H_{11}NO_4$: C, 51.80; H, 5.99. Found: C, 51.9; H, 6.32.

Example II

The procedure of Example I was repeated employing 6.5 g. (0.1 mole) of potassium cyanide and 130 g. (2.0 moles) of hydrogen cyanide added over a period of 15 minutes. The mixture was heated at 80° C. for a total of 3 hours. The product was obtained in comparable yield.

Example III

The procedure of Example I was repeated with the exception that 0.13 g. (0.002 mole) of potassium cyanide was employed and the hydrogen cyanide was added over a period of 30 minutes. The mixture was heated at 36° C. for about 24 hours. Comparable results were obtained.

Example IV

The procedure of Example II was repeated at a temperature of 120° C. for a period of 2 hours with comparable results.

Example V

Eighteen and one-half grams (0.1 mole) of 1-cyano-2,3-dicarbomethoxypropane was refluxed with 50 ml. of a 25% solution of sodium hydroxide in 40% aqueous methanol.

After cooling, the reaction mixture was carefully acidified with hydrochloric acid and extracted continuously with ether for 12 hours. The ether solution was then dried and concentrated under reduced pressure to obtain tricarballylic acid. As recrystallized from acetic acid, the product had a melting point of 157–159° C. Mixed melting point and infra-red analysis showed product identical with authentic tricarballylic acid.

Exaxmple VI

The procedure of Example I was repeated employing sodium cyanide in place of potassium cyanide.

After six hours, the reaction mixture was distilled and most (about 90%) of dimethyl itaconate recovered unreacted.

Example VII

The procedure of Example I was repeated employing dibutyl itaconate in place of dimethyl itaconate.

The dibutyl itaconate was recovered, unreacted, from the reaction mixture after 6 hours of heating.

What is claimed is:

1. A process for the preparation of 1-cyano-2,3-dicarbomethoxypropane which process comprises slowly introducing, over a period of at least 15 minutes, from about 1 to about 1.2 mole of hydrogen cyanide into one mole of dimethyl itaconate in the presence of from about 0.1 to about 5 mole percent, based on said itaconate, of potassium cyanide while heating at a temperature of from about 36° C. to about 120° C. for from about two to about twenty-four hours and agitating the reaction mixture.

2. A process as claimed in claim 1 wherein the reaction is carried out at a temperature from about 60° C. to about 80° C. for from about 3 to about 7 hours.

3. A process as claimed in claim 1 wherein the hydrogen cyanide is added over a period of from about 15 to about 60 minutes.

References Cited in the file of this patent

UNITED STATES PATENTS 2,623,895    Steinbrunn  ----------- Dec. 30, 1952

OTHER REFERENCES

Bredt et al.: Ann. 293, pages 338 to 341 and 351. (1896).

Migrdichian: "Chemistry of Organic Cyanogen Compounds," 1947, page 220.